Patented Aug. 18, 1931

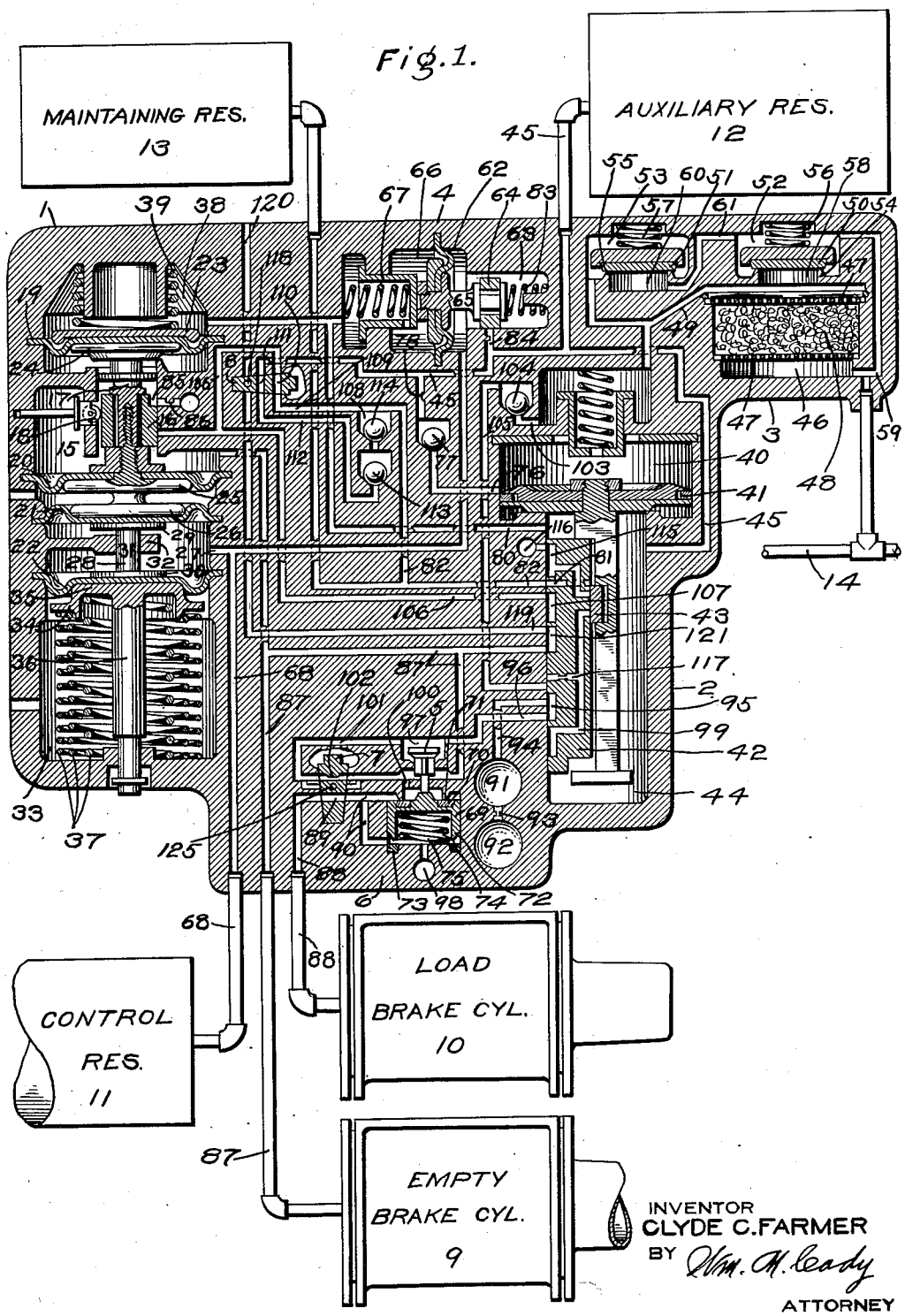

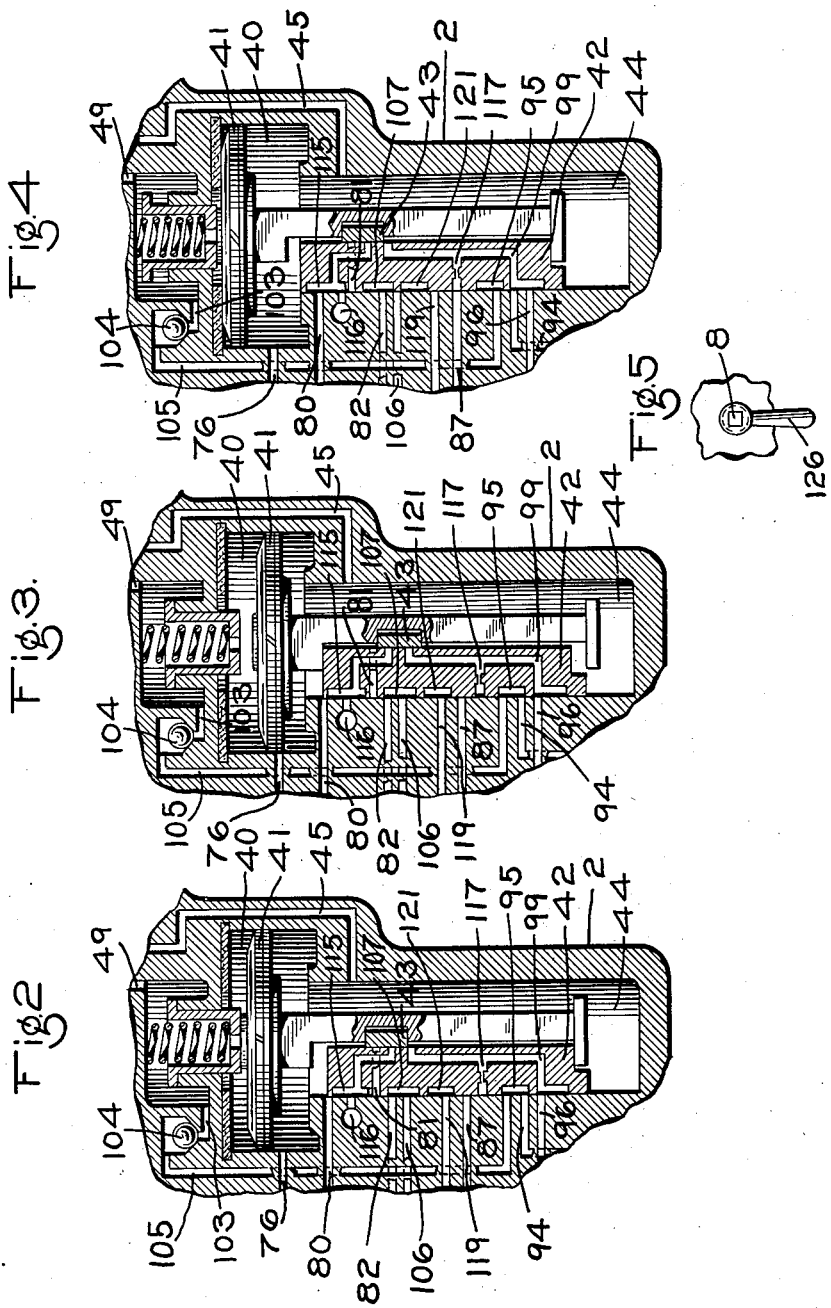

1,819,506

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed March 12, 1929. Serial No. 346,294.

This invention relates to fluid pressure brakes and has for its principal object the provision of improved valve means for controlling the application and release of the brakes.

Another object of my invention is to provide a fluid pressure brake equipment in which a predetermined brake cylinder pressure will be automatically maintained regardless of leakage of fluid under pressure from the equipment.

Another object of my invention is to provide an improved empty and load brake equipment.

Another object of my invention is to provide a fluid pressure brake equipment embodying means which is operative to one position to vent the brake cylinder or brake cylinders directly to atmosphere when releasing the brakes, and which is operative to another position to prevent the direct venting of the brake cylinders and provide for a graduated release of the brakes.

Other objects and advantages will appear in the following more detailed description of the invention.

In the accompanying drawings, Fig. 1 is a diagrammatic sectional view of a fluid pressure brake equipment embodying my invention; Figs. 2, 3 and 4 are fragmentary sectional views of the equipment showing the triple valve piston and associated slide valves in service, service lap and emergency positions, respectively; and Fig. 5 is a fragmentary view showing the handle for operating the release change-over valve.

According to my invention, the brake equipment may comprise a control valve device 1, a triple valve device 2, a strainer device 3, a charging valve device 4, a quick inshot valve 5, a load cylinder cut-in valve device 6, an empty and load change-over valve 7, a release change-over valve 8, an empty brake cylinder 9, a load brake cylinder 10, a control reservoir 11, an auxiliary reservoir 12, a maintaining reservoir 13 and a brake pipe 14.

In the drawings of the present embodiment of the invention, the pistons and piston rods of the empty and load brake cylinders, and the mechanism connecting the piston rods, have not been shown since they, in themselves, form no part of this invention. However, it is to be understood that there will be a mechanism employed which will permit the piston and piston rod of the empty brake cylinder 9 to move outwardly in applying the brakes without causing outward movement of the piston of the load brake cylinder 10. For this purpose, a mechanism may be employed which is of the same general character as that shown and described in United States Letters Patent 1,125,215, issued January 19, 1915, in the name of Walter V. Turner, for empty and load brake apparatus.

The control valve device 1 may comprise a casing having a valve chamber 15 containing a control slide valve 16 which is carried by a stem 17 and is held to its seat by a spring pressed roller 18 and which is adapted to be operated by spaced flexible diaphragms 19, 20, 21 and 22 secured in the casing.

The flexible diaphragm 19 is clamped between one side of a follower plate 23 and one side of a follower head 24 formed on the upper end of the stem 17. The lower end of this stem is provided with a follower portion comprising spaced follower heads 25 and 26, the flexible diaphragm 20 being secured to the head 25 and the diaphragm 21 being adapted to engage the under side of the head 26.

Contained in a diaphragm chamber 27 is a follower member 28 having spaced top and bottom heads 29 and 30 respectively which are connected by a stem 31, slidably guided in a bracket 32 preferably integral with the casing. The head 29 is adapted to engage the under side of the diaphragm 21 and the head 30 engages the upper side of the diaphragm 22.

Contained in a chamber 33 at one side of the diaphragm 22 is a follower member 34 having a follower head 35 engaging the under side of the diaphragm 22 and also having a stem 36 which is slidably guided in the casing. This follower is subject to the pressure of springs 37 which are interposed between the follower head 35 and the casing.

A chamber 38, at the upper side of the flexible diaphragm 19, contains a spring 39 which is interposed between the follower 23 and the casing.

The triple valve device 2 may comprise a casing having a piston chamber 40 connected to the brake pipe 14 and containing a piston 41, a main slide valve 42 and an auxiliary slide valve 43 operable by the piston 41 and contained in a valve chamber 44 which is connected to the auxiliary reservoir 12 by way of passage and pipe 45.

The strainer device 3 is interposed between the brake pipe 14 and the triple valve device 2 and is for the purpose of removing foreign matter from the fluid stream before it enters the triple valve device. This device may comprise a casing having a chamber 46 containing a filter which may comprise spaced perforated plates 47 between which plates there is placed a filtering medium 48, such as curled hair or the like. The chamber 46 at one side of the filter is connected to the brake pipe 14 and at the other side of the filter is connected to the piston chamber 40 of the triple valve device by way of a passage 49.

For the purpose of permitting the flow of fluid under pressure to and from the piston chamber 40 of the triple valve device in case the foreign matter extracted from the fluid stream becomes congealed in the filtering medium 48 and prevents the flow of fluid therethrough, I provide by-pass means which will permit fluid under pressure to flow from the brake pipe to the piston chamber 40 and vice versa around the filter. This means may comprise valves 50 and 51 which are contained in valve chambers 52 and 53 respectively and which are normally maintained seated on their respective seat rings 54 and 55 by the pressure of springs 56 and 57. The valve 50 when seated, closes a passage 58 leading from the chamber 46 at the top of the filter to the valve chamber 52. The chamber 46 at the bottom of the filter is connected to the valve chamber 52 by way of a passage 59, and the chamber 52 is connected to a chamber 60 under the valve 51 by way of a passage 61. and the valve-chamber 53 is connected to the passage 49.

Under normal conditions in operating the brakes fluid under pressure is free to flow through the filter. Assuming the filter to be clogged so as to prevent the flow of fluid under pressure therethrough, fluid under pressure supplied from the brake pipe will flow to the chamber 60 under the valve 51 by way of the lower portion of the filter chamber 46, passage 59, valve chamber 52 and passage 65. Now when the pressure of fluid in chamber 60 becomes great enough to overcome the pressure of the spring 57, the valve 51 will be unseated so that fluid under pressure flows to the piston chamber 40 of the triple valve device by way of valve chamber 53 and passage 49. In releasing the brakes, the pressure of fluid in the chamber 52 will be reduced and the pressure of fluid from the chamber 40 present in the passage 58, unseats the valve 50 against the pressure of the spring 56, so that fluid will flow from the chamber 40 to the brake pipe by way of passage 49, the upper portion of the filter chamber 46, passage 58, valve chamber 52, passage 59 and lower portion of the chamber 46.

The charging valve device 4 may comprise a casing in which there is secured a flexible diaphragm 62, the chamber 63 at one side of the diaphragm containing a slide valve 64 which is adapted to be operated by a stem 65 secured at one end to the diaphragm 62. Contained in a chamber 66 at the other side of the diaphragm 62 is a spring pressed stop 67 with which one end of the stem 65 is adapted to engage to control the operation of the slide valve 64 as will hereinafter more fully appear.

The control reservoir 11 is constantly connected with the diaphragm chamber 27 of the control valve device and the valve chamber 63 of the charging valve device through pipe and passage 68.

The load cylinder cut-in valve device may comprise a casing containing a valve piston 69 having a valve 70 adapted to seat against a seat ring 71 and having a valve 72 adapted to seat against an annular washer 73 mounted in the casing. Contained in a chamber 74, at one side of the valve piston, is a spring 75, the pressure of which is adapted to maintain the valve 70 normally seated on the seat ring 71. The valve piston 69 is provided with an upwardly extending centrally arranged projection which is in engagement with the lower end of the stem of the quick inshot valve 5.

In initially charging the equipment, fluid under pressure supplied to the brake pipe 14 flows to the triple valve piston chamber 40 by way of the strainer device 3 in the manner hereinbefore described, causing the piston 41 and slide valves 42 and 43 to assume their release positions, as shown in the drawings, in which fluid under pressure is supplied from the piston chamber 40 to the auxiliary reservoir 12 through passage 76, past a ball check valve 77, a choked passage 78 and passage and pipe 45. Fluid under pressure from passage 45 also flows into the slide valve chamber 44.

With the main slide valve 42 of the triple valve device in release position, fluid under pressure from the valve chamber 44 flows to the chamber 66 of the charging valve device 4 and to the chamber 38 of the control valve device by way of a passage 80. From the valve chamber 44 fluid under pressure is also supplied to the maintaining reservoir 13 by way of a port 81 in the main slide valve 42 and passage and pipe 82.

Fluid under pressure supplied to the diaphragm chamber 66 of the charging valve device 4, through passage 80, causes the diaphragm 62 to operate to move the stem 65 and slide valve 64 toward the right hand against the pressure of a spring 83. With the slide valve in its right hand or charging position, fluid under pressure flows from the passage 45 to the chamber 27 of the control valve device 1 and to the control reservoir 11 through a restricted passage 84, valve chamber 63 of the charging valve device and passage 68.

Fluid under pressure supplied to the chamber 27 of the control valve device 1, acting on the diaphragm 22, causes the diaphragm to operate to move the follower member 34 to move downwardly against the pressure of the springs 37, the follower 28, due to gravity, moving downwardly with the diaphragm 22.

When the pressures of fluid in the chambers 38 and 27 of the control valve device are substantially equal, the control valve device will be balanced and the pressure of the spring 39 will cause the diaphragms 19, 20 and 21, stem 17 and slide valve 16 to move downwardly to its lowermost or release position in which the chamber 15 is connected to atmosphere by way of a cavity 85 in the slide valve 16 and a choked atmospheric passage 86.

When the pressure of fluid in the valve chamber 63 of the charging valve device is substantially equal to the pressure of fluid in the diaphragm chamber 66, the pressure of the spring 83 causes the stem 65 to operate to return the slide valve 64 to its normal position in which the passage 84 is lapped, thus closing off further supply of fluid under pressure to the control reservoir 11 and chamber 27 of the control valve device.

With the triple valve device and control valve device in release positions, the empty brake cylinder 9 is connected to atmosphere by way of a pipe and passage 87, valve chamber 15 in the control valve device, cavity 85 in the control slide valve 16 and atmospheric passage 86, and the load brake cylinder 10 is connected to atmosphere through pipe and passage 88, a passage 89 in the change-over valve 7, passage 90, past the normally unseated valve 72, through chamber 74 and atmospheric passage 98.

With the main slide valve 42 of the triple valve device in release position, two quick service chambers 91 and 92, which are connected by a restricted passage 93, are connected to atmosphere by way of a passage 94, a cavity 95 in the slide valve 42, a passage 96, valve chamber 97 containing the quick inshot valve 5, past the unseated valve 5 and through passage 87 to atmosphere as described in connection with the venting of the empty brake cylinder 9.

From the foregoing, it will be seen that the equipment is fully charged and is in the normal release position, in which the brake cylinders 9 and 10 are both vented to atmosphere.

A service application of the brakes is effected by making a gradual reduction in the pressure of fluid in the brake pipe 14 in the usual manner and consequently in the piston chamber 40 in the triple valve device 2. Fluid under pressure in the slide valve chamber 44, acting on the under side of the piston 41, causes it to operate to shift the auxiliary slide valve 43 and main slide valve 42 to their service positions, in which fluid under pressure from the auxiliary reservoir 12 and connected valve chamber 44 is supplied to the empty brake cylinder 9 through a port 99 in the main slide valve 42, which has been uncovered by the auxiliary slide valve 43 during its initial upward movement relative to the main slide valve, the passage 96 and valve chamber 97, past the unseated quick inshot valve 5 and the fluted portion of its stem and through passage and pipe 87.

Fluid under pressure from the passage 87 also flows through a restricted passage 100 to the inner seated area of the valve 70 of the load cut-in valve device 6, and when the pressure of fluid acting on this area builds up to a predetermined degree, the valve piston 69 is forced downwardly against the pressure of the spring 75, unseating the valve 70 and seating the valve 72. When the valve piston is thus forced downwardly, the quick inshot valve 5, due to gravity, moves downwardly with it and seats, thus closing off the unrestricted flow of fluid under pressure from the valve chamber 97 to the passage 87.

With the quick inshot valve 5 thus seated, fluid under pressure will flow to the empty brake cylinder 9 by way of passage 96, valve chamber 97, a passage 101, a restricted passage 102 in the change-over valve 7 and passage and pipe 87. From the passage 87, fluid under pressure flows to the load brake cylinder 10 through the restricted passage 100, past the unseated valve 70, passage 90, passage 89 in the change-over valve 7 and passage and pipe 88. When the valve 72 seats, communication of the passage 90 with atmosphere is closed off so that there will be no loss of fluid under pressure from the brake cylinders by way of chamber 74 and atmospheric passage 98 in the load cut-in valve device 6.

With the triple valve device 2 in service position, fluid under pressure from the piston chamber 40 flows to the quick service chamber 91 by way of passage 103, past a ball check valve 104, a passage 105, cavity 95 in the main slide valve 42 and passage 94. From the chamber 91, fluid under pressure flows to the quick service chamber 92 by way of the restricted passage 93. Since the brake pipe has unrestricted communication with the chamber 91 when the triple valve device is in service position, the initial venting of fluid from the brake pipe to the chamber 91 will be at a very fast rate and will cause the well known quick service serial action throughout the train, but as the volume of the chamber 91 is small, the degree of brake pipe reduction will not be sufficient to effect an emergency application of the brakes or cause a surge of the fluid in the brake pipe which might cause an undesired release of some of the brakes. After this initial reduction in brake pipe pressure, the rate of reduction in brake pipe pressure will be reduced by the flow of fluid to the chamber 92 through the restricted passage 93 until such reduction ceases by equalization of pressures in the brake pipe and chambers 91 and 92, thus effecting the usual quick service decrease in brake pipe pressure.

Since the diaphragm chamber 38 of the control valve device is connected to the valve chamber 44 of the triple valve device 2, by way of passage 80, when the triple valve device is in service position, the pressure of fluid in the chamber 38 will reduce with the pressure of fluid in the auxiliary reservoir and as the pressure is thus reduced, the pressure of fluid in the chamber 27 acting on the diaphragm 21 causes the stem 17 and control slide valve 16 to move upwardly until such time as the pressure of fluid supplied to the chamber 15 of the control valve device, by way of passage 87, is sufficient to balance the forces acting upon the diaphragms, at which time, the upward movement of the slide valve 16 will be stopped in its middle or lap position, thus lapping the atmospheric passage 86 and maintaining a passage 106 lapped. With the main slide valve 42 of the triple valve device in service position, fluid under pressure from the maintaining reservoir 13 flows to the slide valve seat of the control valve device by way of pipe and passage 82, cavity 107 in the main slide valve 42 and passage 106.

If, in effecting an application of the brakes, it is desired to limit the brake cylinder pressure, the usual brake valve is operated to lap position, and when the pressure of fluid in the piston chamber 40 of the triple valve device becomes slightly greater than the pressure of fluid in the valve chamber 44, the piston 41 will operate to shift the auxiliary slide valve 43 to service lap position, in which the valve 43 laps the port 99 in the main slide valve 42 and thus closes off the further supply of fluid under pressure from the chamber 44 to the brake cylinders.

To release the brakes after a service application, the pressure of fluid in the brake pipe 14 is increased in the usual manner, causing the triple valve device 2 to be moved to release position, in which the auxiliary reservoir 12 and chamber 38 of the control valve device 1 are recharged. The recharging of the chamber 38 causes the control valve device to be unbalanced so that the pressure of fluid in this chamber, acting on the diaphragm 19, will cause the control slide valve 16 to be shifted downwardly to release position, in which the brake cylinders are vented to atmosphere by way of pipe and passage 87, diaphragm chamber 15 in the control valve device, cavity 85 in the control slide valve 16 and atmospheric passage 86.

When the brake cylinder pressure has thus been reduced to a predetermined degree, the pressure of the spring 75 of the load cylinder cut-in valve device 6 will cause the valve piston 69 to move upwardly and seat the valve 70 against the seat ring 71. As the valve piston is thus moved, the valve 72 will unseat, so that the remaining fluid under pressure in the load cylinder 10 flows to atmosphere by way of pipe and passage 88, passage 89 in the change-over valve 7, passage 90, past the unseated valve 72, and through chamber 74 and passage 98. It will be noted that fluid under pressure from the empty brake cylinder 9 continues to flow to atmosphere by way of passage 86 in the control valve device as hereinbefore described.

To effect a graduated release of the brakes, the release change-over valve 8 must be in the position as shown in Fig. 1 of the drawings.

In effecting a graduated release of the brakes, the pressure of fluid in the brake pipe 14 is increased in the usual manner, causing the triple valve device 2 to be moved to release position in which the auxiliary reservoir 12 and valve chamber 44 of the triple valve device are supplied with fluid under pressure through passage 76, past the ball check valve 77, through the restricted passage 78 and passage 45. With the main slide valve 42 thus returned to release position, the auxiliary reservoir is further supplied with fluid under pressure from the maintaining reservoir 13 by way of pipe and passage 82, port 81 in the slide valve 42 of the triple valve device, slide valve chamber 44 and passage and pipe 45, thus effecting a quick recharge of the auxiliary reservoir.

With the main slide valve 42 of the triple valve device in release position, fluid under pressure is again supplied from the slide valve chamber 44 to the diaphragm chamber 38 of the control valve device by way of passage 80, and when the pressure of fluid in this latter chamber, acting on the diaphragm 19, is sufficient to unbalance the control valve device, said device will operate to release position, in which fluid under pressure from the brake cylinders and connected valve chamber 15 of the control valve device is vented to the atmosphere as described. If the supply of fluid under pressure to the brake pipe 14 is closed off by lapping the brake valve in the usual manner, the auxiliary reservoir pressure continues to build up from the maintaining reservoir 13, and when the auxiliary reservoir pressure in valve chamber 44, of the triple valve device, is slightly greater than brake pipe pressure present in the piston chamber 40, the triple valve piston 41 is caused to move upwardly, and when the piston passes the passage 76, flow of fluid under pressure therethrough to the auxiliary reservoir 12 and valve chamber 44 is closed off. As the piston thus moves, the auxiliary slide valve 43 is moved with it, relative to the main slide valve 42, and covers the port 81 in the main slide valve, thus closing off the further supply of fluid under pressure from the maintaining reservoir 13 to the valve chamber 44.

Now, when the brake cylinder pressure, present in valve chamber 15 of the control valve device, acting on the large diaphragm 20, has been reduced sufficiently to balance the pressure of fluid in chamber 38 acting on the upper side of the smaller diaphragm 19, the pressure of fluid in chamber 27, acting on the under side of the diaphragm 21, causes the control valve device to operate to lap position in which the further discharge of fluid under pressure from the chamber 15 is closed off, thus maintaining the desired brake cylinder pressure.

Since the quick service chambers 91 and 92 and the brake cylinders 9 and 10 are connected, and all are connected to atmosphere when the triple valve device is in release or graduated release lap position, the pressure of fluid in these chambers 91 and 92 reduce with the pressure of fluid in the brake cylinders. Should a brake application be effected before a complete release of the brakes, the reduction in brake pipe pressure into the quick service chambers will be less than if the chambers were completely vented, so that the action of the triple valve device 2 will be retarded to an extent dependent upon the pressure of fluid in these chambers. This is especially desirable when a train is being operated down a grade where cycling of the brakes is practiced. By maintaining the pressure of fluid in the quick service chambers at brake cylinder pressure, the action of the triple valve device will be retarded to such an extent that the proper braking action will be insured, which would not be the case if the quick service chambers were completely vented each time the triple valve device moved to release position. If the quick service chambers were so vented, then each time the triple valve device moved to service position there would be objectionable severe braking action throughout the train.

Should the brake cylinder pressure in the valve chamber 15 be reduced due to leakage from the brake cylinders or by too great a brake cylinder piston travel, the pressure of fluid in the chamber 27 in the control valve device, acting on the diaphragm 21, causes the control valve device to operate to its uppermost position, in which the slide valve 16 maintains the atmospheric passage 86 lapped and uncovers the passage 106. When the triple valve device is in service lap position and the control slide valve 16 moves to its uppermost position, fluid under pressure will flow from the maintaining reservoir 13 by way of pipe and passage 82, cavity 107 in the main slide valve 42 of the triple valve device 2, passage 106, past the end of the control slide valve 16, through valve chamber 15, passage 87 and from thence to the brake cylinders as before described, thus maintaining the brake cylinder pressure.

When the triple valve device is in graduated release lap position and the slide valve 16 of the control valve device is in its uppermost position, fluid under pressure will flow from the maintaining reservoir 13 to the brake cylinders by way of pipe and passage 82, a check valve chamber 108, passage 109, a passage 110 in the release change-over valve 8, passage 106, past the end of the control slide valve 16, through valve chamber 15 and passage 87 as described. Should the pressure of fluid from the maintaining reservoir 13 be reduced to auxiliary reservoir pressure, fluid under pressure fom the auxiliary reservoir will also be supplied to the brake cylinders by way of passage 45, passage 111 in the release change-over valve 8, passage 112, past ball check valves 113 and 114, through the valve chamber 108 containing the ball check valve 114 and then through passage 109 as described.

Now, should auxiliary reservoir pressure in chamber 44 of the triple valve device be reduced below brake pipe pressure in piston chamber 40, the triple valve piston 41 will move downwardly to its release position, in which fluid under pressure flows from the piston chamber 40 to the brake cylinders by way of passage 76, past the ball check valve 77, passage 45, passage 111 in the release change-over valve 8 and then through passage 112 as described, thus the brake cylinder pressure will be maintained by the supply of fluid under pressure from the brake pipe 14.

When the control valve device is in its uppermost position and the pressure of fluid being supplied to the chamber 15 and acting on the diaphragm 20 becomes great enough to overcome the pressure of fluid acting on the diaphragm 21, the slide valve 16 will be caused to move downwardly until it laps the passage 106, closing off the further supply of fluid to the brake cylinders, at which time the control valve device will come to rest in its middle or lap position.

If at any time, the pressure of fluid in the chamber 27 in the control valve device should be reduced by leakage, the pressure of the spring 37 of the control valve device will cause the follower member 34, diaphragm 22 and follower member 28 to move upwardly until the head 29 of the member 28 engages the under side of the diaphragm 21 and prevents the unintentional operation of the control valve 16. It will thus be seen that the pressure of the springs 37 will compensate for the loss of fluid under pressure from the chamber 27.

When an emergency application of the brakes is initiated by a sudden reduction in brake pipe pressure, the triple valve piston 41 is shifted to its uppermost or emergency position, with a consequent movement of the slide valves 42 and 43. When the slide valves 42 and 43 thus moved, fluid under pressure from the valve chamber 44 flows to the empty brake cylinder 9 by way of port 99 in the main slide valve 42, passage 96, valve chamber 97, past the unseated quick inshot valve 5 and its fluted stem, and passage and pipe 87. With the slide valve 42 in emergency position, a cavity 115 therein connects the passage 80 to an atmospheric passage, thus venting the chamber 38 of the control valve device. With the chamber 38 thus vented, the control valve device will operate to its uppermost position, and fluid under pressure from the maintaining reservoir 13 will also be supplied to the brake cylinder 9 through pipe and passage 82, valve chamber 108, passage 109, passage 110 in the release change-over valve 8, passage 106, past the end of the control slide valve 16, through valve chamber 15 and passage and pipe 87. When the brake cylinder pressure acting on the inner seated area of the valve piston 69 of the load cut-in valve device 6, is sufficient to overcome the pressure of the spring 75, the valve 70 will unseat and the valve 72 seat. As the valve piston is thus moved, the quick inshot valve 5 will move with it and seat so that fluid under pressure will flow from the quick inshot valve chamber 97 to the load brake cylinder 10 by way of passage 101, restricted passage 102 in the change-over valve 7, passage 87, passage 100 past the unseated valve 70 through passage 90, passage 89 in the change-over valve 7 and passage and pipe 88. Fluid under pressure continues to flow to the empty brake cylinder 9 through passage and pipe 87. When the quick inshot valve 5 seats, the flow of fluid under pressure to the brake cylinders will be restricted by reason of its flow through the restricted passage 102, but for the purpose of effecting a more rapid build up in brake cylinder pressure after the valve 5 is seated, I provide the main slide valve 42 of the triple valve device with a port 117 which may be restricted, and which when the slide valve 43 is in emergency position, permits fluid under pressure to flow from the port 99 in the slide valve to the passage 87 and from thence to the brake cylinders without having to pass through the restricted passage 102.

When operating empty cars, it is desirable, for well known reasons, to render the load brake cylinder inoperative, and for this purpose I provide the empty and load change-over valve 7. To cut out the load cylinder 10, the valve 7 is rotated manually through the medium of a handle 126 to a position in which the passage 102 is out of registration with the passages 101 and 87, and the passage 89 is out of registration with the passages 88 and 90, so that the flow of fluid under pressure to the brake cylinders by way of these valve passages 102 and 89 is closed off. However, when the valve is thus operated, a restricted passage 125 in the valve is brought into registration with the passages 87 and 101, so that in effecting an application of the brakes, fluid under pressure will flow from passage 96 to the empty brake cylinder 9 by way of the quick inshot valve chamber 97, past the unseated quick inshot valve 5 and its fluted stem and passage and pipe 87. Now, when the pressure of fluid supplied from the passage 87 by way of passage 100 and acting on the inner seated area of the valve piston 69 is sufficient to overcome the pressure of the spring 75, the valve piston will be caused to move downwardly to its lowermost position, permitting the quick inshot valve 5 to seat, so that the further supply of fluid under pressure to the empty brake cylinder 9 will be by way of the restricted passage 125 in the change-over valve and passage and pipe 87.

The passage 125 is restricted to such an extent that it will require substantially the same time period to effect an application of the brakes with the empty brake cylinder alone as it requires to effect an application with both brake cylinders.

If it should be desired to cut out the graduated release feature, the release change-over valve 8 is turned to a position in which the passage 110 therein will be out of registration with the passages 109 and 106, and the passage 111 will be out of registration with the passages 45 and 112, so that fluid under pressure from the passage 45 will no longer be permitted to flow through the passage 111 to the passage 112, and fluid under pressure from the passage 109 will not be permitted to flow through the passage 110 to the passage 106. With the change-over valve 8 in this position, a passage 118 therein registers with a passage 119 leading from the seat of the main slide valve 42 of the triple valve device and a passage 120 leading to atmosphere. With the triple valve device in release position, the brake cylinders are directly vented to atmosphere by way of passage 87, a cavity 121 in the main slide valve 42, passage 119, passage 118 in the release change-over valve 8 and passage 120.

When the graduated release feature is cut out and the triple valve device is in service or service lap position, the cavity 107 in the main slide valve 42 establishes communication through which fluid under pressure from the retaining reservoir in passage 82 flows to the control slide valve seat through passage 106.

It will thus be noted that with the graduated release feature cut out, the brake cylinder pressure can only be maintained by the pressure of fluid from the maintaining reservoir 13 and only when the triple valve device is in service or service lap position.

With the graduated release feature cut in, the check valves 113 and 114 prevent the back flow of fluid under pressure from the auxiliary reservoir 12 to the maintaining reservoir 13.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake cylinder, a brake pipe, a maintaining reservoir and an auxiliary reservoir, of a valve mechanism for controlling the graduated release of the brakes and for maintaining the brake cylinder pressure against leakage, a valve device operative upon a reduction in brake pipe pressure for supplying fluid under pressure to the brake cylinder and for establishing communication from said maintaining reservoir to said valve mechanism, a valve operative to one position for establishing communication through which fluid under pressure is adapted to be supplied from said maintaining reservoir to said valve mechanism when said valve device is in release lap position and for establishing communication through which fluid under pressure is supplied to the first mentioned communication through said valve and operative to another position for establishing communication through which fluid under pressure is vented to atmosphere independently of said valve mechanism, and for closing both of the communications through said valve.

2. The combination with a brake cylinder, a brake pipe, a maintaining reservoir and an auxiliary reservoir, of a valve mechanism for controlling the graduated release of the brakes, a valve device operative upon a reduction in brake pipe pressure for supplying fluid under pressure to the brake cylinder and for establishing communication through which fluid under pressure is supplied to said valve mechanism, and a manually operable valve having a position for establishing another communication from said maintaining reservoir to said valve mechanism and for establishing communication from said auxiliary reservoir to the second mentioned communication and having another position for closing both communications through said valve and for establishing communication through which fluid under pressure from the brake cylinder is vented to the atmosphere in releasing the brakes to render said valve means inoperative to effect a graduated release of the brakes.

3. The combination with a brake cylinder, a brake pipe, a maintaining reservoir and an auxiliary reservoir, of a valve mechanism for controlling the graduated release of the brakes and for maintaining the brake cylinder pressure against leakage, a valve device operative upon a reduction in brake pipe pressure for supplying fluid under pressure to the brake cylinder and for establishing communication from said maintaining reservoir to said valve mechanism, a valve operative to one position for establishing communication through which fluid under pressure is adapted to be supplied from said maintaining reservoir to said valve mechanism when said valve device is in release lap position and for establishing communication through which fluid under pressure is supplied to the first mentioned communication through said valve and operative to another position for establishing communication through which fluid under pressure is vented to atmosphere independently of said valve mechanism, and for closing both of the communications through said valve, and means for preventing the flow of fluid from said maintaining reservoir to said auxiliary reservoir when said valve is in graduated release position.

4. The combination with a brake cylinder, a brake pipe, a maintaining reservoir and an auxiliary reservoir, of a valve mechanism for controlling the graduated release of the brakes and for maintaining the brake cylinder pressure against leakage, a valve device operative upon a reduction in brake pipe pressure for supplying fluid under pressure to the brake cylinder and for establishing communication from said maintaining reservoir to said valve mechanism, a valve operative to one position for establishing communication through which fluid under pressure is adapted to be supplied from said maintaining reservoir to said valve mechanism when said valve device is in release lap position and for establishing communication through which fluid under pressure is supplied to the first mentioned communication through said valve and operative to another position for establishing communication through which fluid under pressure is vented to atmosphere independently of said valve mechanism, and for closing both of the communications through said valve, and means for preventing the flow of fluid from said maintaining reservoir to said auxiliary reservoir when said valve is in graduated release position, said means permitting fluid under pressure to flow through the first mentioned communication established by said valve from said auxiliary reservoir to said valve means when the pressure of fluid in said maintaining reservoir is reduced below that of the auxiliary reservoir.

In testimony whereof I have hereunto set my hand, this 26 day of February, 1929.

CLYDE C. FARMER.